(12) United States Patent  
White et al.

(10) Patent No.: US 8,941,536 B2  
(45) Date of Patent: Jan. 27, 2015

(54) SHORT-RANGE HOMODYNE RADAR SYSTEM

(75) Inventors: Douglas W. White, Lexington, MA (US); Douglas M. Dugas, Chelmsford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 559 days.

(21) Appl. No.: 13/286,658

(22) Filed: Nov. 1, 2011

(65) Prior Publication Data

US 2013/0106648 A1  May 2, 2013

(51) Int. Cl.
 G01S 13/00 (2006.01)
 G01S 7/03 (2006.01)
 G01S 13/536 (2006.01)
 H01P 5/18 (2006.01)

(52) U.S. Cl.
 CPC ............... *G01S 7/03* (2013.01); *G01S 13/536* (2013.01); *H01P 5/185* (2013.01)
 USPC .............................. 342/194; 342/70; 342/175

(58) Field of Classification Search
 CPC ........ G01S 7/032; G01S 3/8022; G01S 11/10
 USPC ................. 342/84, 89, 104, 114, 194
 See application file for complete search history.

(56) References Cited

U.S. PATENT DOCUMENTS

| | | | |
|---|---|---|---|
| 6,392,503 B1 * | 5/2002 | Thornton | 333/116 |
| 7,366,465 B2 * | 4/2008 | Barink et al. | 455/41.1 |
| 7,535,360 B2 * | 5/2009 | Barink et al. | 340/572.2 |
| 2007/0111697 A1 * | 5/2007 | Bellantoni | 455/324 |
| 2008/0272957 A1 * | 11/2008 | Schoeberl | 342/109 |
| 2009/0224960 A1 * | 9/2009 | Ishii et al. | 342/104 |
| 2010/0225416 A1 * | 9/2010 | Ingalls et al. | 333/116 |

OTHER PUBLICATIONS

Tessmann et al., "Compact Single-Chip W-Band FMCW Radar Modules for Commercial High-Resolution Sensor Applications", IEEE Transactions on Microwave Theory and Techniques vol. 50, No. 12, Dec. 2002, pp. 2995-3001.
Kim et al., "A Passive Circulator with High Isolation using a Directional Coupler for RFID", IEEE 0-7803-9542-5/06, pp. 1177-1180.
Podell, "A High Directivity Microstrip Coupler Technique", 1970, pp. 33-36.

(Continued)

*Primary Examiner* — John B Sotomayor  
*Assistant Examiner* — Marcus Windrich  
(74) *Attorney, Agent, or Firm* — Lando & Anastasi, LLP

(57) ABSTRACT

A homodyne radar system includes an oscillator, an antenna, a low noise amplifier, a mixing subsystem and a directional coupler. The oscillator is configured to generate a transmit signal and a local oscillator signal. The antenna is configured to transmit the transmit signal and to receive a receive signal. The low noise amplifier is configured to amplify the receive signal. The mixing subsystem is configured to receive and mix the transmit signal and the receive signal to produce an output signal. The directional coupler is coupled to the antenna, the oscillator, the low noise amplifier and the mixing subsystem. The directional coupler is connected and configured to provide a low-loss transmission path from the antenna to the low noise amplifier and a high loss transmission path from the oscillator to the antenna.

15 Claims, 10 Drawing Sheets

(56) References Cited

OTHER PUBLICATIONS

Bai et al., "A Novel RX-TX Front-Ends for Passive RFID Reader with High Isolation", IEEE 2007 International Symposium on Microwave, Antenna, Propagation, and EMC Technologies for Wireless Communications, pp. 332-335.

March, "Phase Velocity Compensation in Parallel-Coupled Microstrip", IEEE MTT-S Digest 1982, pp. 410-412.

* cited by examiner

SHORT-RANGE HOMODYNE RADAR SYSTEM

FEDERALLY SPONSORED RESEARCH

This invention was made with government support under W900KK-10-C-0025 awarded by the Department of the Army. The U.S. government has certain rights in the invention.

BACKGROUND

Short range Doppler radars use a homodyne system, in which the received signal is mixed with the transmitted signal. Mixing the received and transmitted signals results in a low frequency output that is proportional to the Doppler shift between the received signal and the transmitted signal. However, since the mixing process uses the transmitted signal, isolating the received signal from the transmitted signal is difficult.

FIG. 1 shows a conventional simple Doppler radar system 100 for measuring the velocity of a radar signal relative to the ground. The transmitted signals 104 are generated by an oscillator 110 and transmitted through an antenna 112. The transmitted signals reflect of the target (e.g., the ground) and produce reflected signals 102 which are received at the antenna 112. The transmitted signals 104 is split into a transmitted in-phase ("I") signal 104a and a transmitted quadrature ("Q") signal 104b, where the I signal 104a is ninety degrees out of phase with the Q signal 104b. Similarly, the received signals 102 include a received I signal 102a and a received Q signal 102b. The received I signals 102a and the transmitted I signals 104a are mixed at an I mixer 106. The received Q signals 102b and the transmitted Q signals 104b are mixed at a Q mixer 108. Differences between the I signals 102a and 104a and between the Q signals 102b and 104b are used to determine the direction of travel of the radar system 100.

In the Doppler radar system 100, the transmitted signals 104 are not separated from the received signals 102. Thus, the received signal 102 cannot be independently amplified before it is sent to the mixers 106 and 108. The power of the received signal 102 is low, and is then further divided between the I mixer 106 and the Q mixer 108. Furthermore, the I mixer 106 and the Q mixer 108 are both very lossy. This results in a low Signal to Noise Ratio ("SNR"). In the radar system 100, there are two ways to improve the SNR. One way to improve the SNR is to increase the transmitted signal power (thereby increasing the received signal power). However, increasing the transmitted signal power causes the radar system 100 to draw more DC power and may raise safety concerns. The other way to improve the SNR is to increase the antenna gain by using a larger antenna; however this adds size and cost to the system.

Accordingly, it is often desirable to isolate the received signals 102 from the transmitted signals 104. To achieve isolation between the transmitted signal 104 and the received signal 102 in a homodyne radar, one existing solution is to use two separate antennas: a receive antenna and a transmit antenna. FIG. 2 is a schematic diagram of a Doppler radar system 120 with a separate receive antenna 122 and transmit antenna 124. As shown in FIG. 2, the transmitted signal 104 is generated at the oscillator 110, and then divided at a first power divider 132. Part of the transmitted signal is directed through the transmit antenna 124, and the other part is further divided at a second power divider 134. The second power divider 134 divides the transmitted signal 104 into a local oscillator I signal 104a and a local oscillator Q signal 104b. The local oscillator I signal 104a is sent to a balanced I mixer 136 and the local oscillator Q signal 104b is sent to a balanced Q mixer 138. The received signal 102 is received through the receive antenna 122 and sent to a low noise amplifier 126 for amplification. The amplified received signal 102 is then divided into a received I signal 102a and a received Q signal 102b at the power divider 128. The received I signal 102 is sent to the balanced I mixer 136 and the received Q signal is sent to the balanced Q mixer 138.

Another way to isolate the received signal 102 from the transmitted signal 104 in a homodyne radar is to use a circulator. FIG. 3 is a schematic diagram of a Doppler radar system 150 including a circulator 152. The circulator 152 separates microwave signals based on their direction. The circulator 152 includes three ports: one "transmit in" port for the transmitted signal 104 from the oscillator 110, one combined "transmit-out/receive-in" port for sending the transmitted signal 104 to the antenna 112 and for receiving the reflected signal 102 from the antenna, and one "receive out" port for sending the received signal 102 to the low noise amplifier 126. The circulator 152 provides isolation between the transmitted signal 104 and the received signal 102.

Another way to isolate the received signal 102 from the transmitted signal 104 in a homodyne radar is to use a Wilkinson power divider. FIG. 4 is a schematic diagram of a Doppler radar system 170 including a Wilkinson power divider 172. The Wilkinson power divider 172 separates the received signal 102 from the transmitted signal 104. In a similar design aimed at isolating received signals from transmitted signals in RFID systems, a branch line coupler has been used instead of the Wilkinson power divider 172. Both of these approaches attenuate the received signal significantly, reducing the SNR of the system.

SUMMARY

Conventional homodyne radar systems, and conventional methods for achieving isolation between the transmitted and received signals in such systems, have several limitations and disadvantages. For example, expensive, large or complicated technology is used to isolate the received signal from the transmitted signal.

Aspects and embodiments are directed to systems and methods for isolating the received signal from the transmitted signal in short-range homodyne radars using a directional coupler. According to various aspects, a directional coupler is smaller and less expensive than other technologies used to isolate the received signal from the transmitted signal. According to another aspect, a directional coupler may be integrated into a short-range homodyne radar, thereby avoiding complex installation procedures.

According to one aspect, a homodyne radar system is provided, the homodyne radar system configured to isolate the received signal from the transmitted signal. The homodyne radar system includes an oscillator, an antenna, a low noise amplifier, a mixing subsystem, and a direction coupler. The oscillator is configured to generate a transmit signal. The antenna is configured to transmit the transmit signal and to receive a receive signal. The low noise amplifier is configured to amplify the received signal to provide an amplified signal. The mixing subsystem is configured to receive and mix the transmit signal and the amplified signal to produce an output signal. The directional coupler is coupled to the antenna, the oscillator, the low noise amplifier and the mixing subsystem, and the directional coupler is connected and configured to provide a low-loss transmission path from the antenna to the low noise amplifier and a high-loss transmission path from the oscillator to the antenna.

In one embodiment, the directional coupler includes first a first transmission line that provides the low-loss transmission path, and an input port at a first end of the first transmission line, and the antenna is coupled to the input port. The directional coupler also includes a second transmission line. The directional coupler includes a through port at a second end of the first transmission line, and the low noise amplifier is coupled to the through port. In one embodiment, the directional coupler includes a coupled port at a first end of the second transmission line which is proximate to the first end of the first transmission line, and the oscillator is coupled to the coupled port. In one example, the directional coupler includes an isolated port at a second end of the second transmission line which is proximate the second end of the first transmission line, and the mixing subsystem is coupled to the isolated port. In one embodiment, the oscillator is configured to provide the transmit signal to the mixing subsystem from the coupled port to the isolated port.

According to another embodiment the mixing subsystem includes at least one power divider and first and second balanced mixers. In one example, the first balanced mixer is configured to mix an in-phase portion of the receive signal with an in-phase portion of the transmit signal, and the second balanced mixer is configured to mix a quadrature portion of the receive signal with a quadrature portion of the transmit signal.

According to one embodiment, the directional coupler is configured to impart less than approximately one decibel of loss to the receive signal along the low-loss transmission path. According to another embodiment, the directional coupler is configured to impart a loss of approximately ten decibels to the transmit signal along the high-loss transmission path.

In another embodiment, the directional coupler is a velocity-compensated directional coupler. In one example, the directional coupler includes a second transmission path and the low-loss transmission path and the second transmission path each include a plurality of notches. In another embodiment, the directional coupler is a microstrip directional coupler. In a further embodiment, the directional coupler is a forward wave directional coupler. In another embodiment, the directional coupler is fully monolithic and compatible with modern semiconductor manufacturing processes.

According to another aspect, a method is provided for isolating a received signal from a transmitted signal in a radar system. The method includes generating a transmitted signal at an oscillator, sending the transmitted signal through a high loss path of a directional coupler to an antenna for transmission, receiving a received signal at the antenna, sending the received signal through a low loss path of the directional coupler to an amplifier, amplifying the received signal to provide an amplified signal, and mixing the transmitted signal and the amplified signal.

In one embodiment, the method further includes dividing the transmitted signal into a transmitted I signal and a transmitted Q signal using a first power divider coupled to the oscillator. The method may further include sending the amplified signal from the amplifier to a second power divider, and dividing the amplified signal into a received I signal and a received Q signal. In one example, mixing the transmitted signal and the amplified signal includes mixing the received I signal with the transmitted I signal, and mixing the received Q signal with the transmitted Q signal.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE FIGURES

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Short range Doppler radars use a homodyne system, in which the received signal is mixed with the transmitted signal. According to one example, radar systems compare the received signal to the transmitted signal in order to measure velocity. However, the received signal is often attenuated or masked by noise, and it can be difficult and costly to distinguish the received signal from the transmitted signal.

Figure 1:
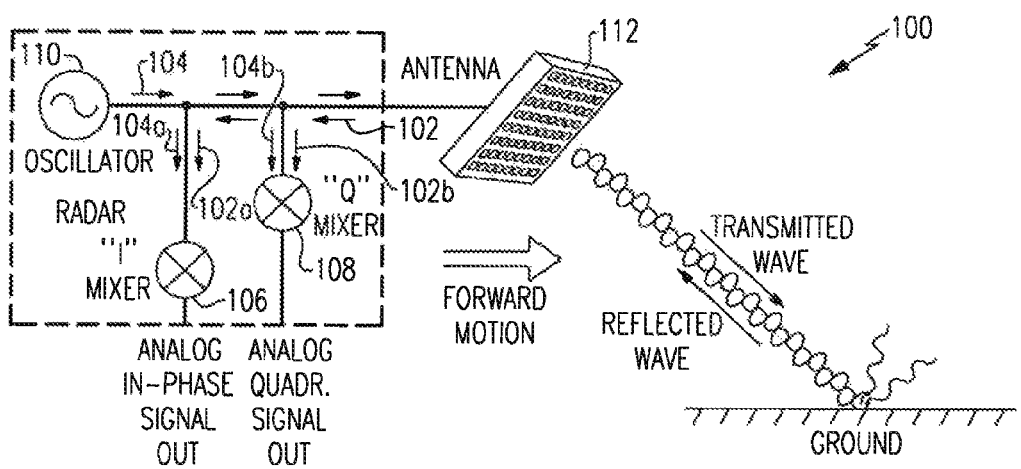
FIG. 1 is a schematic diagram of an example of a conventional homodyne Doppler radar system.
Figure 2:
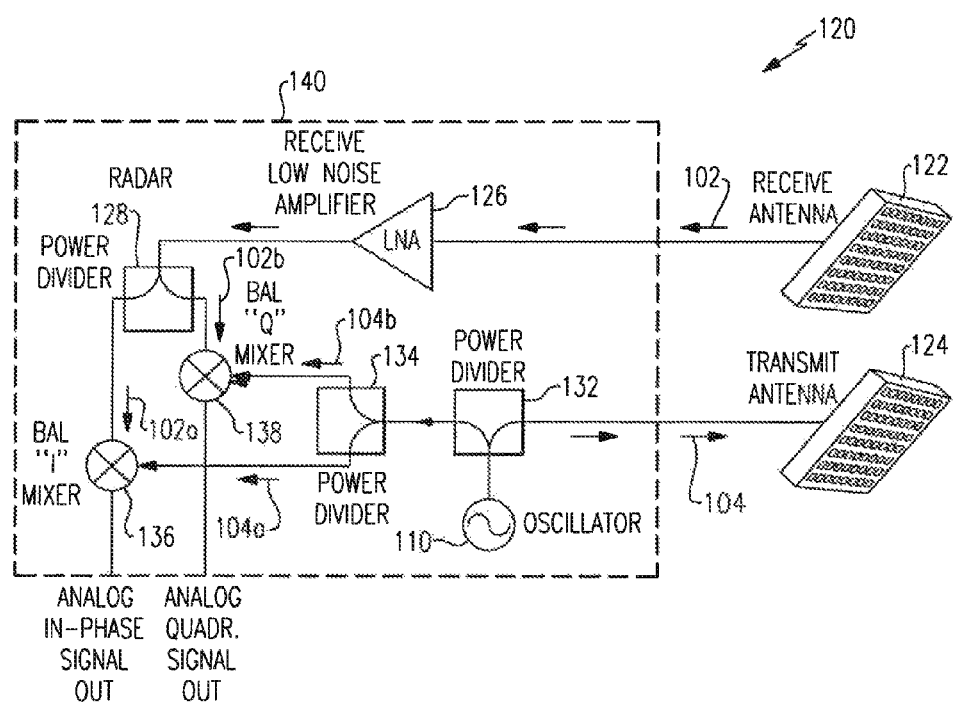
FIG. 2 is a schematic diagram of an example of a conventional Doppler radar system with separate transmit and receive antennas.
Figure 3:
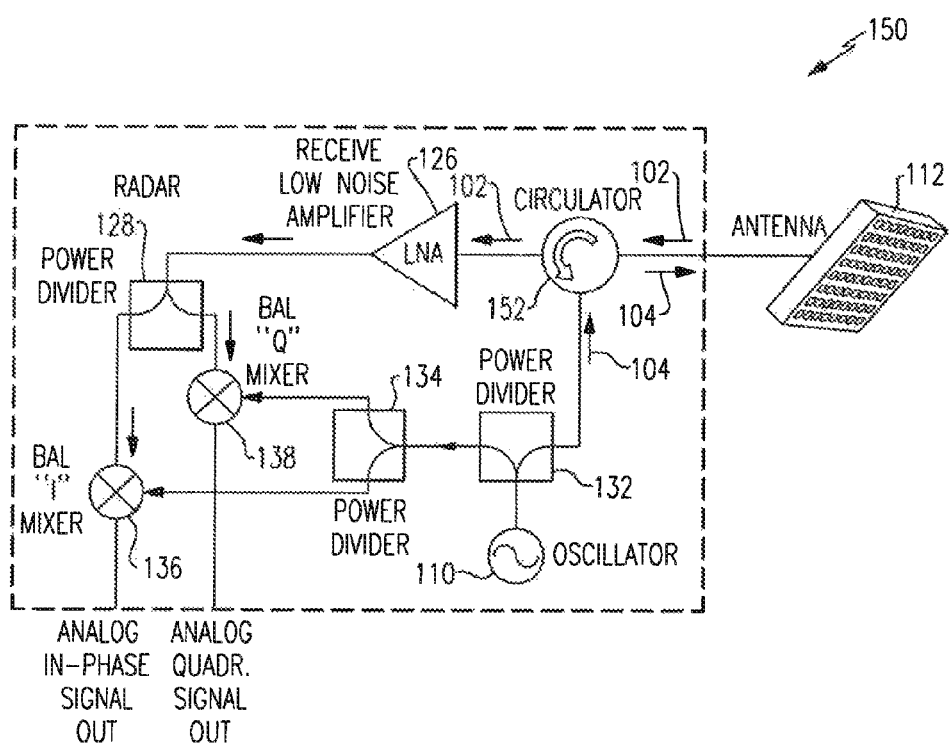
FIG. 3 is a schematic diagram of an example of a conventional Doppler radar system using a circulator.

As discussed above, although several different approaches have been used to achieve isolation between the received signal and the transmitted signal in conventional homodyne radar systems, each of these approaches suffers from disadvantages. For example, although using separate receive and transmit antennas (such as in the radar system 120 discussed above with reference to FIG. 2) generally achieves adequate isolation between the transmitted and received signals, the radar system 120 is large, heavy, and costly compared to other radar systems, such as the radar system 100 of FIG. 1. Using a circulator for isolation, such as in the radar system 150 of FIG. 3, also has several disadvantages, including that is it mechanically difficult to integrate a circulator into a radar system, which adds significant complexity in building the system. For example, both the two-antenna approach of FIG. 2 and circulator approach of FIG. 3 require the use of mechanical interconnects, and low loss, low RF-reflection interconnects at high frequencies (e.g. millimeter-wave frequencies) are difficult to manufacture in a production environment. This problem is particularly noticeable in systems using circulators because there are the three separate interconnections required, one for each of the three circulator ports. Additionally, circulators are expensive, significantly increasing the cost of the radar system 150. In one example, adding a circulator 152 to a radar system 150 adds about fifty dollars to the production cost. In another example, adding a circulator 152 to a radar system 150 doubles the cost of the radar system 150. Furthermore, because a typical navigation system provides orthogonal 3-axis velocity measurements, such systems use three radars, one for each axis. Thus, according to one example, using three radar systems 150 with circulators 152 adds about $150 to the cost of the navigation system. Furthermore, a circulator typically provides less than about 20 dB of isolation between the received signal 102 and the transmitted signal 104.

Figure 4:
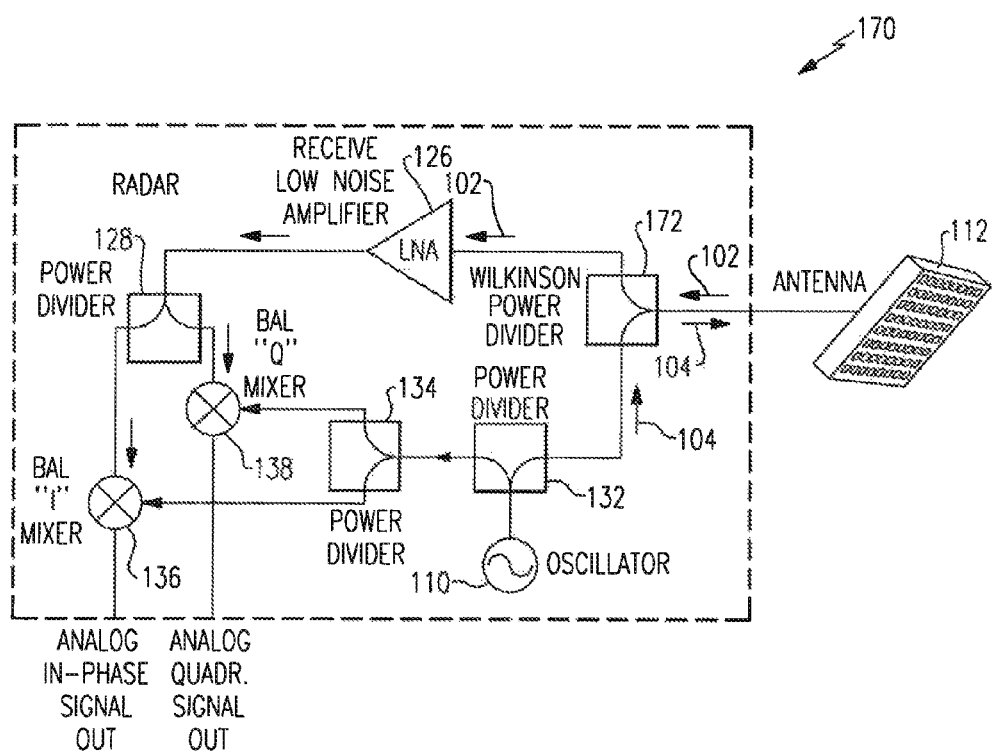
FIG. 4 is a schematic diagram of an example of a conventional Doppler radar system using a Wilkinson power divider.

The Wilkinson power divider 172 used in some systems, as discussed above with reference to FIG. 4, introduces large losses into the radar system 170. Specifically, the Wilkinson power divider 172 of the radar system 170 adds at least about three decibels (dB) of loss to the received signal 102 before it reaches the LNA 126. The 3 dB loss results in a significant decrease in the signal-to-noise ratio (SNR) and a significant increase in the overall receive noise figure. Furthermore, similar to the circulator discussed above, a Wilkinson power divider 172 may provide only about 20 dB of isolation between the received signal 102 and the transmitted signal 104.

Figure 5:
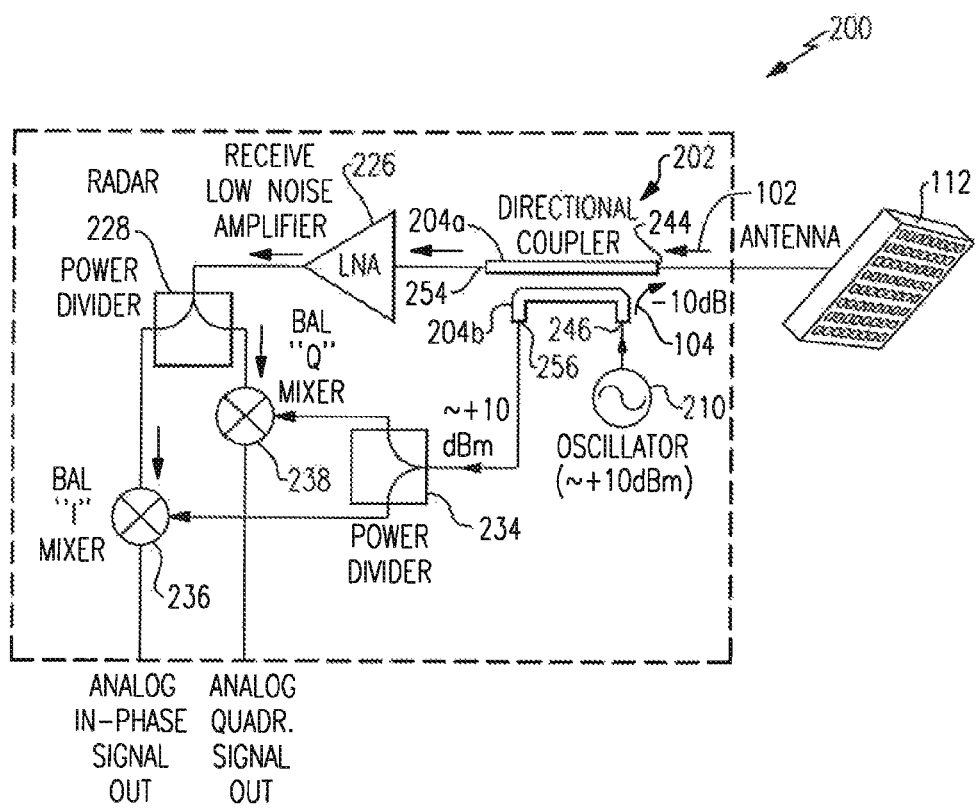
FIG. 5 is a schematic diagram of a Doppler radar system using a directional coupler to isolate the receive and transmit paths according to aspects of the invention.

Thus, conventional homodyne radar systems have numerous limitations and disadvantages. According to one embodiment, in a short-range, low-power homodyne radar system, the received signal 102 may be isolated from the transmitted signal 104 by using a directional coupler as shown in FIG. 5. In one example, the directional coupler is a microwave directional coupler. The directional coupler may be included in the radar system's millimeter-wave integrated circuit, thus adding little cost to the radar and avoiding the need for additional millimeter-wave RF interconnects that are required for two-antenna or circulator designs. As discussed further below, the directional coupler provides a lower-loss, lower-noise solution than using a Wilkinson power divider or branch line coupler, and eliminates the size, weight and cost penalties associated with two-antenna systems.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 5, there is illustrated a schematic diagram of a homodyne Doppler radar system 200 including a directional coupler 202 according to one embodiment. The directional coupler 202 is connected to provide a low loss path between the antenna 212 and the receiver low noise amplifier (LNA) 226. The directional coupler 202 includes a pair of closely spaced, electromagnetically coupled transmission lines: a first (receive path) transmission line 204a and a second (transmit path) transmission line 204b. In one example, the directional coupler 202 is implemented as a backward wave microstrip coupler and the transmission lines 204a and 204b are each approximately one quarter wavelength long. Energy applied at a first port 244 of the directional coupler 202 flows through the first transmission line 204a to a second port 254, and is also preferentially coupled out a third port 246 in the second line 204b opposite the flow of power in the first line 204a. According to one feature, a signal applied at an input port of the directional coupler 202, for example, the received signal applied from the antenna 212 to the first port 244, generates an electromagnetic wave in the first transmission line 204a. Some of the electromagnetic field is coupled to the coupled second transmission line 204b. Similarly, an input signal applied at the third port 246 is coupled to the first port 244, as discussed further below.

As shown in FIG. 5, in one embodiment an antenna 212 is coupled to the first port 244 of the directional coupler 202, and the receiver LNA 226 is coupled to a second port 254. The second, transmit path transmission line 204b is coupled to an oscillator 210 (which generates the transmit signal to be transmitted by the antenna 212) at the third port 246, and to a first power divider 234 at a fourth port 256. The first power divider 234 splits the transmit signal from the oscillator 210 into an in-phase ("I") local-oscillator signal and a quadrature ("Q") local-oscillator signal. Similarly, the received signal is amplified by the LNA 226 and then split into a received I signal and a received Q signal by a second power divider 228. As discussed above, the received I signals and the transmitted I signals are mixed at an I mixer 236. The received Q signals and the transmitted Q signals are mixed at a Q mixer 238. Differences between the two I signals and between the two Q signals are used to determine the direction of travel of the radar system 200.

From the receiver point of view in the radar 200, the first port 244 is the input port of the directional coupler 202, with the signal received by the antenna 212 being applied at that port. The second port 254 is the through port of the directional coupler 202, the third port 246 is the coupled port, and the fourth port 256 is the isolated port. Thus, the signal received by the antenna 212 flows from the first port 244 through the low loss receive path transmission line 204a to the LNA 226 at the second port 254. In one example, the loss in the path from the antenna 212 to the LNA 226 is approximately a fraction of a decibel (dB), for example, less than 0.5 dB.

From the transmitter point of view, the third port 246 becomes the input port of the directional coupler 202, with the transmit signal generated by the oscillator 210 applied at that port. To the transmit signal from the oscillator 210, the first port 244 is the coupled port, the second port 254 is the isolated port, and the fourth port 256 is the through port. Thus, the transmit signal from the oscillator 210 is transmitted from the third port 246 to the fourth port 256 to drive the I and Q mixers 236, 238, as discussed above. The transmission line 204b is a low loss line, and transmission of the transmitted signal 104 from the third port 246 and the fourth port 256 results in only very small signal losses, comparable to the loss in the received signal 102 as it is transmitted from the antenna to the LNA. In one example, the loss in the transmitted signal 104 from the third port 246 to the fourth port 256 is less than about 0.5 dB.

Still referring to FIG. 5, a portion of the signal from the oscillator 210 is also coupled to the first port 244 and then transmitted by the antenna 212. The transmission of the transmitted signal 104 from the third port 246 to the first port 244 results in high losses to the transmitted signal. Specifically, the power of the transmitter signal at the antenna 212 is reduced, relative to the power of the signal when generated by the oscillator 210 and provided at the third port 246, by the coupling factor of the directional coupler 202. The amount of energy coupled from one transmission line 204a or 204b to the other is controlled primarily by the spacing between the two lines. In one embodiment, the directional coupler is configured to couple between about $1/10^{th}$ and $1/100^{th}$ of the energy at the input port to the coupled port, corresponding to a coupling factor of about 10 dB to 20 dB. Thus, in one example, the power in the transmitted signal 104 coupled from the oscillator 210 at the third port 246 to the antenna 212 at the first port 244 is reduced by about 10 dB.

For a short range radar system, the transmit power required can be significantly lower than the signal power needed to drive the mixers 236, 238. As a result, the transmit signal 104 can be "tapped off" the mixer drive signal using the directional coupler 202, as discussed above. In a short range radar, for example, having a range of a few meters and where the transmit power is generally only a few milliwatts, the loss introduced to the transmit signal 104 by the directional coupler 202 is not only acceptable, but beneficial in at least some embodiments due to the difference in the desired power level of the transmitted signal relative to the mixer drive signal. In some radar systems, low transmitted power is required to reduce interference problems with other equipment, and maintain Low-Probability-of-Intercept (LPI) for tactical operations. For example, a short-range radar system 200 may have a range of about 1 to 2 meters and use a transmit power of between about 1 mW and about 5 mW, whereas the oscillator 210 may provide a signal power of about 10 to 50 mW which can be used to drive the mixers 236, 238 as discussed above.

In addition, the energy coupled from the oscillator at the third port 246 into the first transmission line 204a will primarily be sent to the antenna 212 at the first port 244, with very little energy leaking back to the second port 254 and the LNA 226. In one example, the power travelling in the reverse direction from the oscillator 210 to the LNA 226 at the second port 254 may be at least 30 or 40 dB lower than the transmit signal 104 going to the antenna 212. Thus, the directional coupler 202 provides very good isolation at the LNA 226 (e.g., greater than 30 dB) between the received signal 102 traveling through the receive path transmission line 204a from the antenna 212 to the LNA 226 and the transmitted signal 104 traveling from the oscillator 210 to the antenna 212. This allows the use of the LNA 226 to amplify the received signal 102 prior to the received signal being provided to the mixers 236, 238, thereby improving the signal to noise ratio at the mixers. In addition, the radar 200 may use a high gain LNA 226 without the LNA being overridden by leakage from the oscillator 210.

Thus, according to one feature, an inexpensive and small low-power radar 200 suitable for short-range radar systems can be provided by including and configuring the directional coupler 202 to provide a low loss path for the received signal 102 to the LNA 226 and to attenuate the signal from the oscillator 210 to provide a suitable low power transmit signal 104. Furthermore, separating the received signal 102 from the transmitted signal 104 using the directional coupler 202, as discussed above, allows for the use of double balanced mixers 236 and 238. According to one example, double balanced mixers 236 and 238 may be used because the transmit signal 104 is blocked from the receive path by the directional coupler 202, and the received signal 102 may be fed directly into the RF port of the double balanced mixers 236 and 238. According to one feature, double balanced mixers 236 and 238 may be used when the received signal 102 is isolated, and not superimposed with the high level transmitted signal 104. According to one feature, using double balanced mixers largely eliminates the DC offset created by unbalanced mixers which are used in the radar system 100 of FIG. 1.

Figure 6:
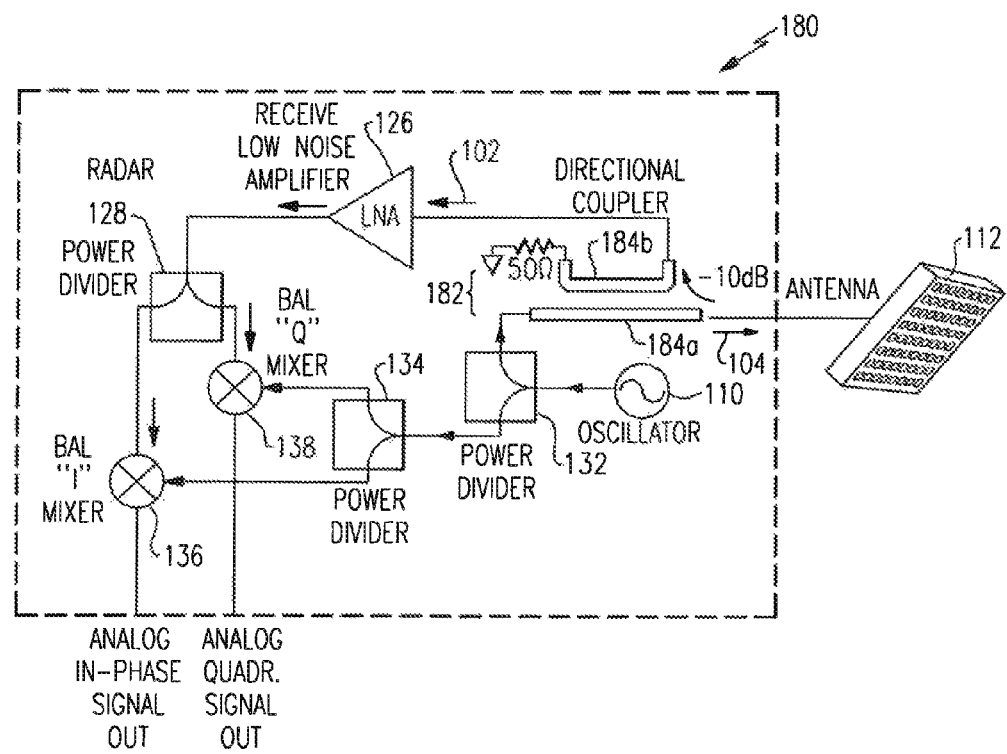
FIG. 6 is a schematic diagram of an example of a conventional Doppler radar system using a directional coupler with high receive losses.

Directional couplers have been used in conventional RFID systems; however, these systems are based on minimizing transmit losses. For example, FIG. 6 is a schematic diagram of a system 180 using a directional coupler 182 connected in the system in a manner that provides a low-loss path for the transmitted signal. This configuration, however, results in high losses to the received signal. In particular, the first transmission line 184a of the directional coupler 182 is coupled to the first power divider 132 and the antenna 112 such that the transmitted signal 104 travels through a low loss path to the antenna 112. However, a received signal 102 from the antenna 112 is coupled from the antenna port to the second transmission line 184b of the directional coupler 182, and therefore suffers high losses. In one example, the directional coupler 182 causes the amplitude of the received signal 102 to decrease by about 10 dB. Thus, if the configuration of FIG. 6 were applied to a Doppler radar system, the high losses in the receive path would significantly degrade the overall receive SNR, making such a configuration highly undesirable.

According to various examples, the radar system 200 may provide many advantages over conventional homodyne radar systems. For example, as discussed above with reference to FIG. 2, a radar system 120 using separate transmit and receive antennas 122 and 124 is large, heavy, expensive, and requires two separate millimeter-wave connections to the integrated circuit 140 in the radar system 120. Low loss, low RF-reflection interconnects at millimeter wave frequencies are difficult to produce, and are therefore expensive. The radar system 150 using the circulator 152 is expensive, and requires three separate millimeter wave connections to the circulator 152. The radar system 170 with the Wilkinson divider 172 may result in a higher loss to the received signal 102 and increased noise as compared with the radar system 200. Additionally, since the radar system 200 may have a higher gain at the LNA 226 than the system 150 or the system 170 (because the directional coupler 202 may provide better isolation than either the circulator or Wilkinson power divider approaches), the gain at the baseband signal electronics of the radar system 200 may be reduced, reducing the overall power consumption of the radar system 200 compared to the systems 150 and 170, and also reducing the number of parts used in the radar system 200.

Figure 7:
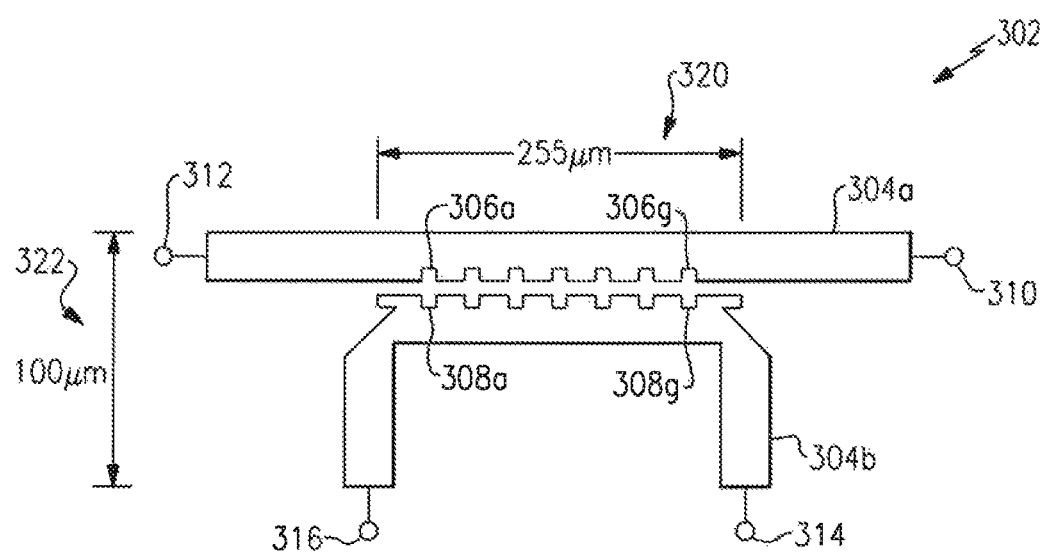
FIG. 7 is a schematic diagram of a directional coupler having velocity compensation according to aspects of the invention.

According to various embodiments, the radar system 200 may be used as a ground velocity sensor. In one embodiment, the radar system 200 may be a ground velocity sensor used in a navigation system, for example, to supplement a GPS (global positioning system) navigation unit when the GPS signal is not available (referred to as a "GPS-denied" environment). The radar system 200 may be used in a vehicle-based navigation system or in a handheld navigation system. In various examples, a handheld navigation system including the radar system 200 may be used by civilian first-responders, such as firefighters and other rescue workers, and it may be used by soldiers. According to one feature, the low power usage of the radar system 200 allows for safe usage in handheld devices. In another example, the radar system 200 may be included in robots or robotic vehicles. In one embodiment, the radar system 200 may be used in automotive radars. In one example, the radar system 200 may be used in automotive applications to measure the distance to nearby objects by introducing a frequency sweep on the transmitted signal.

Where the radar system 200 is used, it may be desirable to include velocity compensation techniques in the directional coupler. FIG. 7 is a schematic diagram of one example of a microstrip directional coupler 302 having velocity compensation features. In the illustrated example, the directional coupler 302 includes two strips of metal (a first transmission line 304a and a second transmission line 304b) positioned over a ground plate (not shown), and has first 310, second 312, third 314 and fourth 316 ports, as discussed above. According to one feature, the first port 310 is the input port, the second port 312 is the through port, the third port 314 is the coupled port, and the fourth port 316 is the isolated port.

According to one embodiment, notches 306a-306g and 308a-308g in the velocity-compensated directional coupler 302 provide velocity compensation. At very high frequencies (e.g., millimeter-wave frequencies), velocity compensation corrects for differences in even-mode velocities and odd-mode velocities in the coupled transmission lines 304a and 304b. According to one feature, velocity compensation assists in achieving a directional coupler with very high isolation, for example, approximately 35 dB or greater, which is considerably higher than may be achieved with millimeter wave circulators or Wilkinson dividers.

Figure 8:
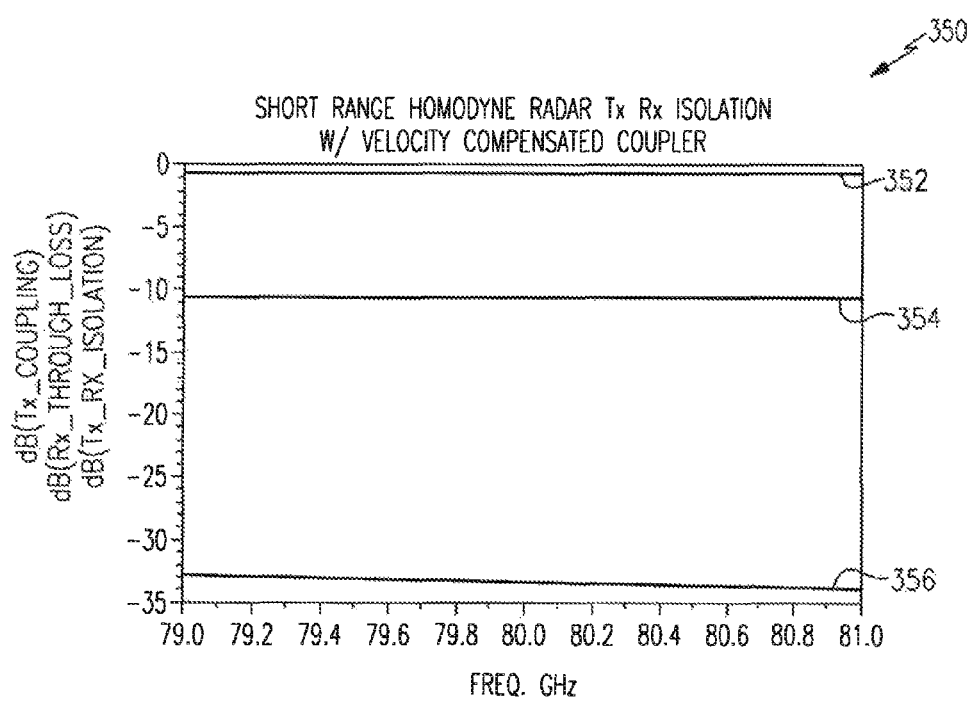
FIG. 8 is a graph showing an exemplary response of a directional coupler according to aspects of the invention.

Referring to FIG. 8, there is illustrated a graph 350 showing an example of a response of a directional coupler (including velocity compensation), according to one embodiment. The example directional coupler has a length 320 of about 255 µm, and a width 322 (measured across both transmission lines 304a and 304b) of about 100 µm. As shown in the graph 350, the response of the example coupler was measured over the frequency range of about 79 GHz to about 81 GHz. In this range, the coupling factor (represented by trace 354) is approximately 10.5 dB, the through-loss (i.e., the loss through the first transmission line 304a from the first port to the second port; represented by trace 352) is about 0.5 dB, and the isolation is approximately 33 dB to 34 dB.

Figure 9:
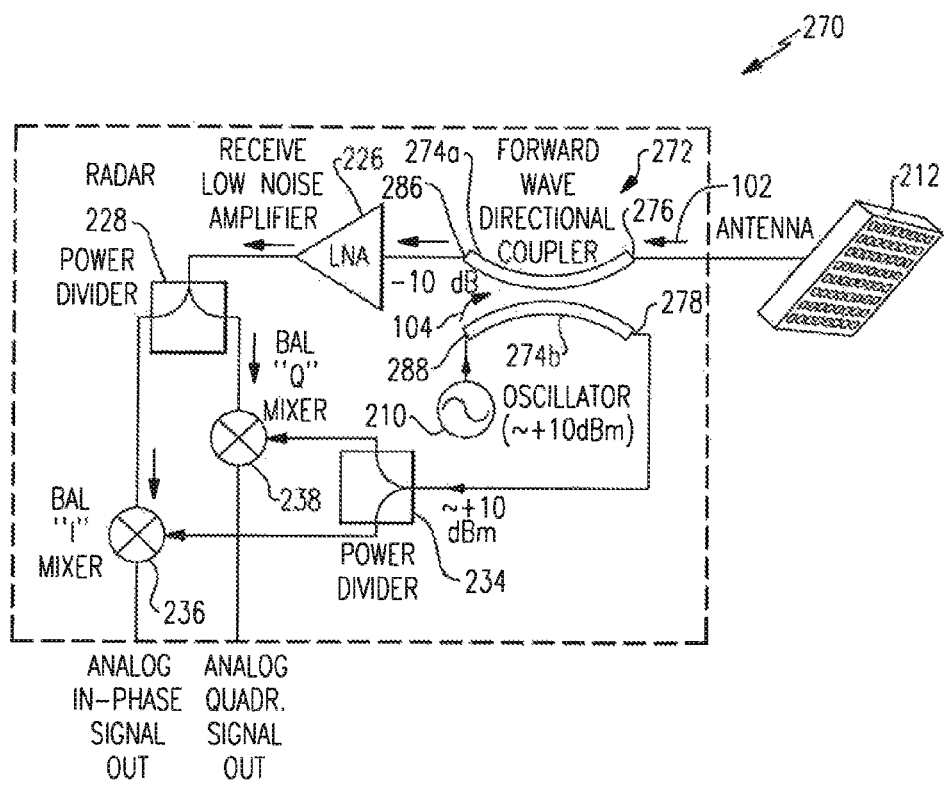
FIG. 9 is a schematic diagram of a Doppler radar system using a forward wave directional coupler to isolate the receive and transmit paths according to aspects of the invention.

In the embodiments discussed above, the directional coupler 202 has been illustrated as a backward wave coupler. As discussed above, for a backward wave coupler implemented using microstrip transmission lines, the lines may be approximately ¼ wavelength long. According to another embodiment, the directional coupler may instead be implemented as a forward wave directional coupler, as illustrated for example in FIG. 9. FIG. 9 is a schematic diagram of one example of a homodyne Doppler radar system 270 including a forward wave directional coupler 272 according to one embodiment. Similar to the backward wave coupler, the forward wave directional coupler 272 includes two electromagnetically coupled transmission lines: a first (receive path) transmission line 274a and a second (transmit path) transmission line 274b. The transmission lines 274a and 274b may each be several wavelengths long. In various examples, the transmission lines 274a and 274b are each about one, about two, about three, about four or about five wavelengths long. However, although the forward wave coupler 272 at several wavelengths in length is larger than the backward wave coupler 202, which may be only a quarter wavelength long, at millimeter wave frequencies, the forward wave coupler can still be less than several millimeters in length.

As shown in FIG. 9, the receive path transmission line 274a of the forward wave directional coupler 272 has a first port 276 coupled to the antenna 212 and a second port 286 coupled to the receiver LNA 226. The transmit path transmission line 274b has a fourth port 288 coupled to the oscillator 210, and a third port 278 coupled to the first power divider 234. From the receiver point of view in the radar 270, the first port 276 is the input port, the second port 286 is the through port, the third port 278 is the isolated port, and the fourth port 288 is the coupled port. From the transmitter point of view, the fourth port 288 becomes the input port, the first port 276 is the coupled port, the second port 286 is the isolated port, and the third port 278 is the through port. The transmitted signal 104 applied at the fourth port 288 from the oscillator 210 is coupled to the first port 276 to be transmitted by the antenna 212, and is attenuated by the coupling factor of the coupler. Thus, transmission of the transmitted signal 104 from the fourth port 288 to the first port 276 results in high losses to the transmitted signal 104, as discussed above. In one example, the power in the transmitted signal 104 coupled from the oscillator 210 at the fourth port 288 to the antenna 212 at the first port 276 is reduced by about 10 dB. In another example, the power in the transmitted signal 104 coupled from the oscillator 210 at the fourth port 288 to the antenna 212 at the first port 276 is reduced by between about 6 dB and about 15 dB. The received signal 102 is transmitted via the low-loss transmission line 274 to the LNA 226, as discussed above.

Thus, similar to the radar system 200 discussed above, another example of an inexpensive and small low-power radar 270 suitable for short-range radar systems can be provided by including and configuring the forward wave directional coupler 272 to provide a low loss path for the received signal 102 to the LNA 226 and to attenuate the signal from the oscillator 210 to provide a suitable low power transmit signal 104. According to one feature, forward wave couplers such as the forward wave coupler 272 have looser fabrication tolerances than backward wave couplers, and therefore may be easier and/or less expensive to manufacture. Furthermore, forward wave couplers are easily made with high directivity, and accordingly may be desirable for certain applications.

Figure 10:
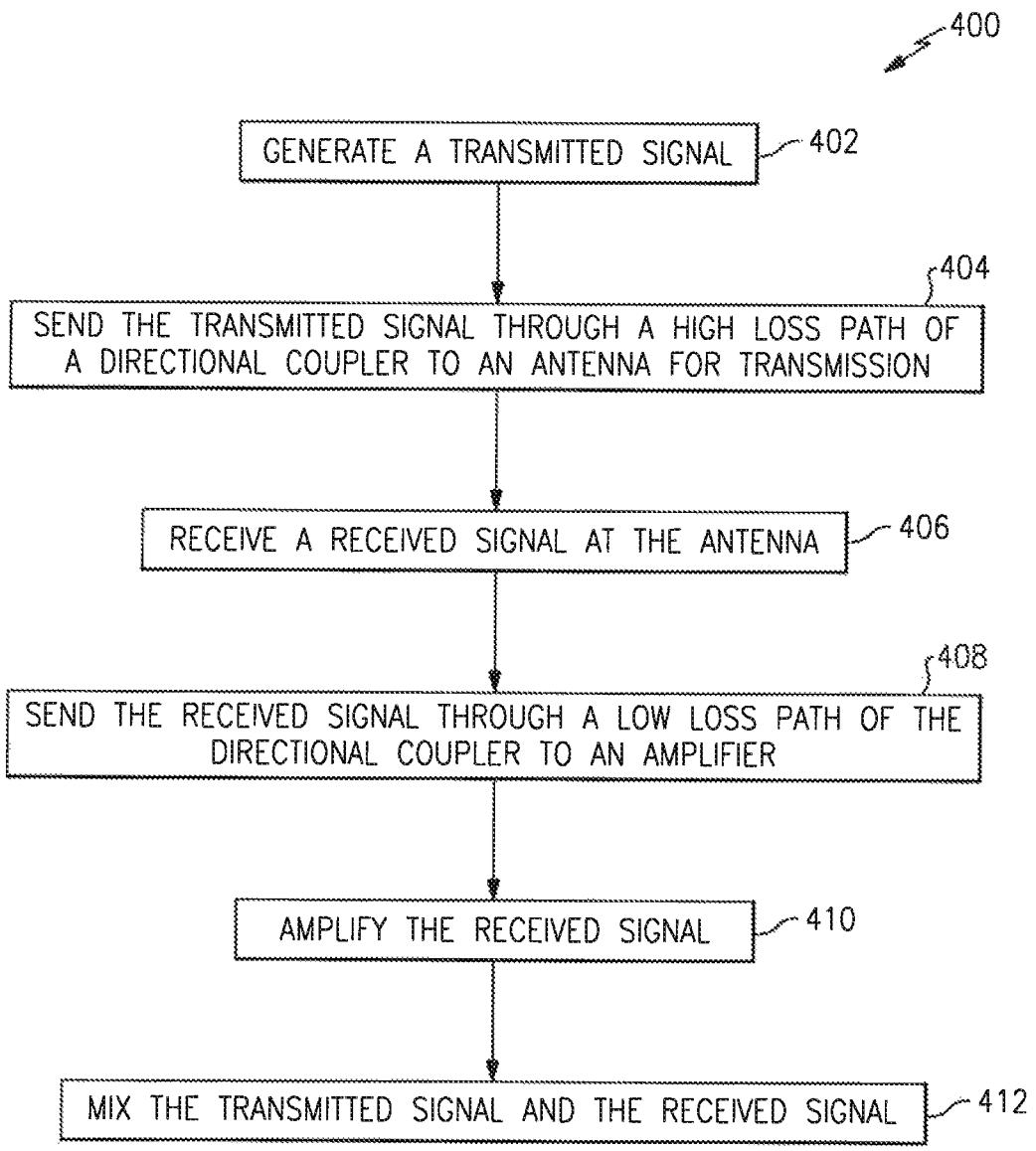
FIG. 10 is a flow chart showing an example of a method of isolating the received signal from the transmitted signal in a short-range homodyne radar according to aspects of the invention.

FIG. 10 is a flow chart showing a method 400 of isolating the received signal from the transmitted signal in a short-range homodyne radar, according to one embodiment. At step 402, an oscillator in the radar generates a transmitted signal. At step 404, the transmitted signal is sent through a high loss path of a directional coupler to an antenna for transmission.

According to one example, the transmitted signal loses about ten decibels at the directional coupler, and is then transmitted from the radar. At step 406, the received signal is received at the antenna. At step 408, the received signal is sent through a low loss path of the directional coupler to an amplifier. According to one feature, the received signal loses less than one decibel of amplitude during transmission from the antenna to the amplifier. The amplifier amplifies the received signal at step 410. At step 412, the transmitted and received signals are mixed.

In one embodiment, the received I signals are mixed with the transmitted I signals and the received Q signals are mixed with the transmitted Q signals. Thus, according to one embodiment, the transmitted signal is sent through the directional coupler to a power divider, and the power divider divides the transmitted signal into I and Q signals. Similarly, according to another embodiment, the received signal is sent from an amplifier to a power divider which divides the received signal into I and Q signals.

Accordingly, various aspects and embodiments are directed to a system and method of isolating the received signal from the transmitted signal in a homodyne radar, as discussed above. According to one embodiment, a directional coupler is used to send the received signal to a low noise amplifier with minimal losses, while allowing high losses to the transmitted signal. According to one feature, using the low loss path of the directional coupler for the received signal allows for a high signal to noise ratio of the received signal, and for the received signal to be amplified before being mixed in the mixing stage of the radar system. According to one feature, a low amplitude transmitted signal is sufficient for short-range radars, and therefore, connecting the directional coupler to minimize loss in the receive path (but allowing loss in the transmit path) is acceptable. As discussed above, this result may be particularly beneficial for short-range radars where only low transmit power, in particular transmit power that is significantly lower that the power used to drive the mixing stage, is needed.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of illustration, and the scope of the invention should be determined from proper construction of the appended claims, and their equivalents.

What is claimed is:

1. A homodyne radar system, comprising:
   an oscillator configured to generate a transmit signal;
   an antenna configured to transmit the transmit signal and to receive a receive signal;
   a low noise amplifier configured to amplify the received signal to provide an amplified signal;
   a mixing subsystem configured to receive and mix the transmit signal and the amplified signal to produce an output signal; and
   a directional coupler coupled to the antenna, the oscillator, the low noise amplifier and the mixing subsystem, the directional coupler including a first transmission line, an input port at a first end of the first transmission line, a through port at a second end of the first transmission line, a second transmission line, a coupled port at a first end of the second transmission line, and an isolated port at a second end of the second transmission line, the first end of the first transmission line being proximate the first end of the second transmission line, and the second end of the first transmission line being proximate the second end of the second transmission line, wherein the antenna is coupled to the input port, the low noise amplifier is coupled to the through port, the oscillator is coupled to the coupled port, and mixing system is coupled to the isolated port, and wherein the directional coupler is configured to provide a low-loss transmission path from the antenna to the low noise amplifier and a high-loss transmission path from the oscillator to the antenna, the first transmission line providing the low-loss transmission line.

2. The homodyne radar system of claim 1, wherein the oscillator is configured to provide the transmit signal to the mixing subsystem from the coupled port to the isolated port.

3. The homodyne radar system of claim 1, wherein the mixing subsystem includes at least one power divider and first and second balanced mixers.

4. The homodyne radar system of claim 3, wherein the first balanced mixer is configured to mix an in-phase portion of the receive signal with an in-phase portion of the transmit signal, and wherein the second balanced mixer is configured to mix a quadrature portion of the receive signal with a quadrature portion of the transmit signal.

5. The homodyne radar system of claim 1, wherein the directional coupler is configured to impart less than approximately one decibel of loss to the receive signal along the low-loss transmission path.

6. The homodyne radar system of claim 1, wherein the directional coupler is configured to impart a loss of approximately ten decibels to the transmit signal along the high-loss transmission path.

7. The homodyne radar system of claim 1, wherein the directional coupler is a velocity-compensated directional coupler.

8. A homodyne radar system comprising:
   an oscillator configured to generate a transmit signal;
   an antenna configured to transmit the transmit signal and to receive a receive signal;
   a low noise amplifier configured to amplify the received signal to provide an amplified signal;
   a mixing subsystem configured to receive and mix the transmit signal and the amplified signal to produce an output signal; and
   a velocity-compensated directional coupler coupled to the antenna, the oscillator, the low noise amplifier and the mixing subsystem, the velocity-compensated directional coupler being connected and configured to provide a low-loss transmission path from the antenna to the low noise amplifier and a high-loss transmission path from the oscillator to the antenna;
   wherein the velocity-compensated directional coupler includes a second transmission path, and wherein the low-loss transmission path and the second transmission path each includes a plurality of notches.

9. The homodyne radar system of claim 1, wherein the directional coupler is a microstrip directional coupler.

10. The homodyne radar system of claim 1, wherein the directional coupler is a forward wave directional coupler.

11. A method of isolating a received signal from a transmitted signal in a homodyne radar system, comprising:
   generating a transmitted signal at an oscillator;
   sending the transmitted signal through a high loss path of a directional coupler to an antenna for transmission, the directional coupler including a first transmission line, an input port at a first end of the first transmission line, a through port at a second end of the first transmission line, a second transmission line, a coupled port at a first end of the second transmission line, and an isolated port at a second end of the second transmission line, the first end of the first transmission line being proximate the first end of the second transmission line, and the second end of the first transmission line being proximate the second end of the second transmission line, the oscillator being coupled to the coupled port and the antenna being coupled to the input port;

receiving a received signal at the antenna;

sending the received signal through a low loss path of the directional coupler to an amplifier, the amplifier being coupled to the through port of the directional coupler, and the low loss path being provided by the first transmission line;

amplifying the received signal to provide an amplified signal; and mixing the transmitted signal and the amplified signal using a mixing system coupled to the isolated port of the directional coupler.

12. The method of claim 11, further comprising:

dividing the transmitted signal into a transmitted I signal and a transmitted Q signal using a first power divider coupled to the oscillator.

13. The method of claim 12, further comprising:

sending the amplified signal from the amplifier to a second power divider; and dividing the amplified signal into a received I signal and a received Q signal.

14. The method of claim 13, wherein mixing the transmitted signal and the amplified signal includes:

mixing the received I signal with the transmitted I signal; and mixing the received Q signal with the transmitted Q signal.

15. The homodyne radar system of claim 7, wherein the directional coupler includes a second transmission path, and wherein the low-loss transmission path and the second transmission path each includes a plurality of notches.

* * * * *